US010282714B2

(12) United States Patent
Bajan

(10) Patent No.: US 10,282,714 B2
(45) Date of Patent: *May 7, 2019

(54) ONLINE ELECTRONIC TRANSACTION AND FUNDS TRANSFER METHOD AND SYSTEM

(71) Applicant: E.E. System Corporation, Nanaimo (CA)

(72) Inventor: Joseph Peter Bajan, Nanaimo (CA)

(73) Assignee: E.E. System Corporation, Nanaimo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/033,491

(22) Filed: Sep. 22, 2013

(65) Prior Publication Data

US 2014/0019356 A1    Jan. 16, 2014

Related U.S. Application Data

(63) Continuation of application No. 09/667,621, filed on Sep. 22, 2000, now Pat. No. 8,543,495, which is a continuation-in-part of application No. 09/592,901, filed on Jun. 12, 2000, now abandoned.

(51) Int. Cl.
| | | |
|---|---|---|
| G06Q 40/00 | (2012.01) | |
| G06Q 20/10 | (2012.01) | |
| G06Q 40/02 | (2012.01) | |
| G06Q 20/02 | (2012.01) | |

(Continued)

(52) U.S. Cl.
CPC ......... *G06Q 20/108* (2013.01); *G06Q 20/023* (2013.01); *G06Q 20/10* (2013.01); *G06Q 20/22* (2013.01); *G06Q 20/42* (2013.01); *G06Q 40/02* (2013.01)

(58) Field of Classification Search
USPC .................................................... 705/39, 40
See application file for complete search history.

(56) References Cited

U.S. PATENT DOCUMENTS 5,689,100 A  * 11/1997 Carrithers et al. ............ 235/380
5,845,265 A     12/1998 Woolston
5,897,621 A      4/1999 Boesch et al.
(Continued)

FOREIGN PATENT DOCUMENTS

JP            02202692 A        8/1990

OTHER PUBLICATIONS

Knudson, Scott et al. ,"Business-to-business payments and the role of financial electronic data interchange", Federal Reseve Bulletin, v80, n4, pp. 269-278, Apr. 1994.*

(Continued)

*Primary Examiner* — Hani M Kazimi
(74) *Attorney, Agent, or Firm* — Bruce M. Green; Oyen Wiggs Green & Mutala LLP

(57) ABSTRACT

Existing e-commerce is carried out largely using credit card charges, which are expensive in terms of transaction charges and not particularly secure. The present invention provides an online funds transfer system which avoids transmitting sensitive information over the Internet, and utilizes the security and simplicity of the Automated Clearing House system, and the benefits of pre-approved payment and debit systems. It does this by using the bank Automated Clearing House system through pre-approved debits from the purchaser's bank account and payment distribution to the vendor's bank account.

20 Claims, 3 Drawing Sheets

(51) Int. Cl.
*G06Q 20/22* (2012.01)
*G06Q 20/42* (2012.01)

(56) References Cited

U.S. PATENT DOCUMENTS

| | | | |
|---|---|---|---|
| 5,903,878 A | 5/1999 | Talati et al. | |
| 5,991,748 A | 11/1999 | Taskett | |
| 6,023,685 A | 2/2000 | Brett et al. | |
| 6,058,380 A | 5/2000 | Anderson et al. | |
| 6,105,008 A | 8/2000 | Davis et al. | |
| 6,169,975 B1 | 1/2001 | White et al. | |
| 6,173,269 B1* | 1/2001 | Solokl | G07F 19/201 705/35 |
| 6,185,545 B1 | 2/2001 | Resnick et al. | |
| 6,216,115 B1 | 4/2001 | Barrameda et al. | |
| 6,243,689 B1* | 6/2001 | Norton | G06Q 20/04 705/18 |
| 6,311,170 B1 | 10/2001 | Embrey | |
| 6,327,577 B1 | 12/2001 | Garrison et al. | |
| 6,339,766 B1 | 1/2002 | Gephart | |
| 6,341,273 B1 | 1/2002 | Briscoe | |
| 6,405,182 B1 | 6/2002 | Cuervo | |
| 6,467,684 B2 | 10/2002 | Fite et al. | |
| 6,760,470 B1 | 7/2004 | Bogosian et al. | |
| 6,947,908 B1* | 9/2005 | Slater | G06Q 20/04 705/50 |
| 6,970,843 B1 | 11/2005 | Forte | |
| 7,003,485 B1 | 2/2006 | Young | |
| 7,089,208 B1 | 8/2006 | Levchin et al. | |
| 7,177,836 B1 | 2/2007 | German et al. | |
| 7,249,097 B2 | 7/2007 | Hutchinson et al. | |
| 7,461,022 B1 | 12/2008 | Churchill et al. | |
| 7,483,856 B2 | 1/2009 | Likourezos et al. | |
| 7,512,563 B2 | 3/2009 | Likourezos et al. | |
| 7,567,937 B2 | 7/2009 | Likourezos et al. | |
| 7,599,881 B2 | 10/2009 | Likourezos et al. | |
| 7,606,760 B2 | 10/2009 | Hutchinston et al. | |
| 7,610,244 B2 | 10/2009 | Likourezos et al. | |
| 7,627,528 B2 | 12/2009 | Likourezos et al. | |
| 7,720,743 B2 | 5/2010 | Marks | |
| 7,761,385 B2 | 7/2010 | Hutchinson et al. | |
| 7,765,124 B2 | 7/2010 | Postrel | |
| 7,908,226 B2 | 3/2011 | Hutchinson et al. | |
| 2002/0016769 A1 | 2/2002 | Barbara et al. | |
| 2004/0015438 A1* | 1/2004 | Compiano et al. | 705/40 |
| 2004/0204991 A1 | 10/2004 | Monahan et al. | |

OTHER PUBLICATIONS

Shugoll Research, "Automated Clearing House Payments", market research-Banking information, pp. 1-17, Jan. 31, 2000.*

* cited by examiner

ONLINE ELECTRONIC TRANSACTION AND FUNDS TRANSFER METHOD AND SYSTEM

CROSS-REFERENCE TO RELATED APPLICATIONS

This application is a continuation of application Ser. No. 09/667,621, filed Sep. 22, 2000, now U.S. Pat. No. 8,543,495 issued Sep. 24, 2013, which is a continuation-in-part of application Ser. No. 09/592,901 filed Jun. 12, 2000, which is now abandoned.

TECHNICAL FIELD

The invention relates to the field of online transactions and more particularly to a system for the transfer of funds on payment for goods or services using the Internet.

BACKGROUND ART

Currently the majority of Internet-based commercial transactions are conducted using credit card charges. This has a number of drawbacks. The charges levied on the vendor by the banks for credit card transactions are relatively high, typically 3%. Security of the credit card numbers is a problem, and there is therefore a reluctance of consumers to make such transactions. Other online funds transfer methods have been developed, such as electronic purses or wallets, but none of these have achieved wide acceptance due to a number of factors, including cumbersome procedures, unreasonable costs and unfair assignment of risk. Consumers require a high level of trust in such online transaction systems.

Consumers are accustomed to authorizing pre-approved payments to be deducted from a chequing account for many regular payments, such as mortgage and loan payments. Such transactions, which utilize the banking Automated Clearing-House (ACH) System, are relatively secure and inexpensive. Bank authorization of such payments typically requires only a voided cheque from the consumer's designated chequing account, and the consumer's signature, and the bank charge is simply a per transaction charge. Similarly banks will transfer funds into a bank account with minimum authorization and bank charges. Fraud is rarely a problem in these transactions given the nature of the parties involved in the transactions, and consumers have come to trust these procedures.

There is therefore a need for an online funds transfer system which avoids transmitting sensitive information over the Internet, and utilizes the security and simplicity of the ACH system, and the benefits of pre-approved payment and debit systems.

DISCLOSURE OF INVENTION

The present invention therefore provides a method of conducting commercial transactions between a customer and a participating vendor over a global computer network comprising: a) providing a system manager bank account for receiving customer deposits; b) assigning the customer a customer identification number; c) maintaining an account representing the balance of funds held to a customer's credit in the system manager bank account and associating the balance with the customer identification number; d) transferring funds to the customer's credit into the system manager bank account; e) providing bank account information in relation to the participating vendor; f) communicating a proposed charge amount and the customer identification to the system manager; g) the system manager confirming the availability of funds in association with the customer identification and communicating the results of the confirmation to the vendor; h) if sufficient funds to cover the proposed charge amount are available in the system manager bank account in association with the customer identification, transferring the amount of the proposed charge amount to the vendor bank account from the system manager bank account and debiting the account of the customer. In a preferred form of the invention, the funds are transferred to the customer's credit into the system manager bank account by obtaining a customer PAD authorization in favour of the system manager.

BRIEF DESCRIPTION OF DRAWINGS

In drawings which disclose a preferred embodiment of the invention.

BEST MODE(S) FOR CARRYING OUT THE INVENTION

Figure 1:
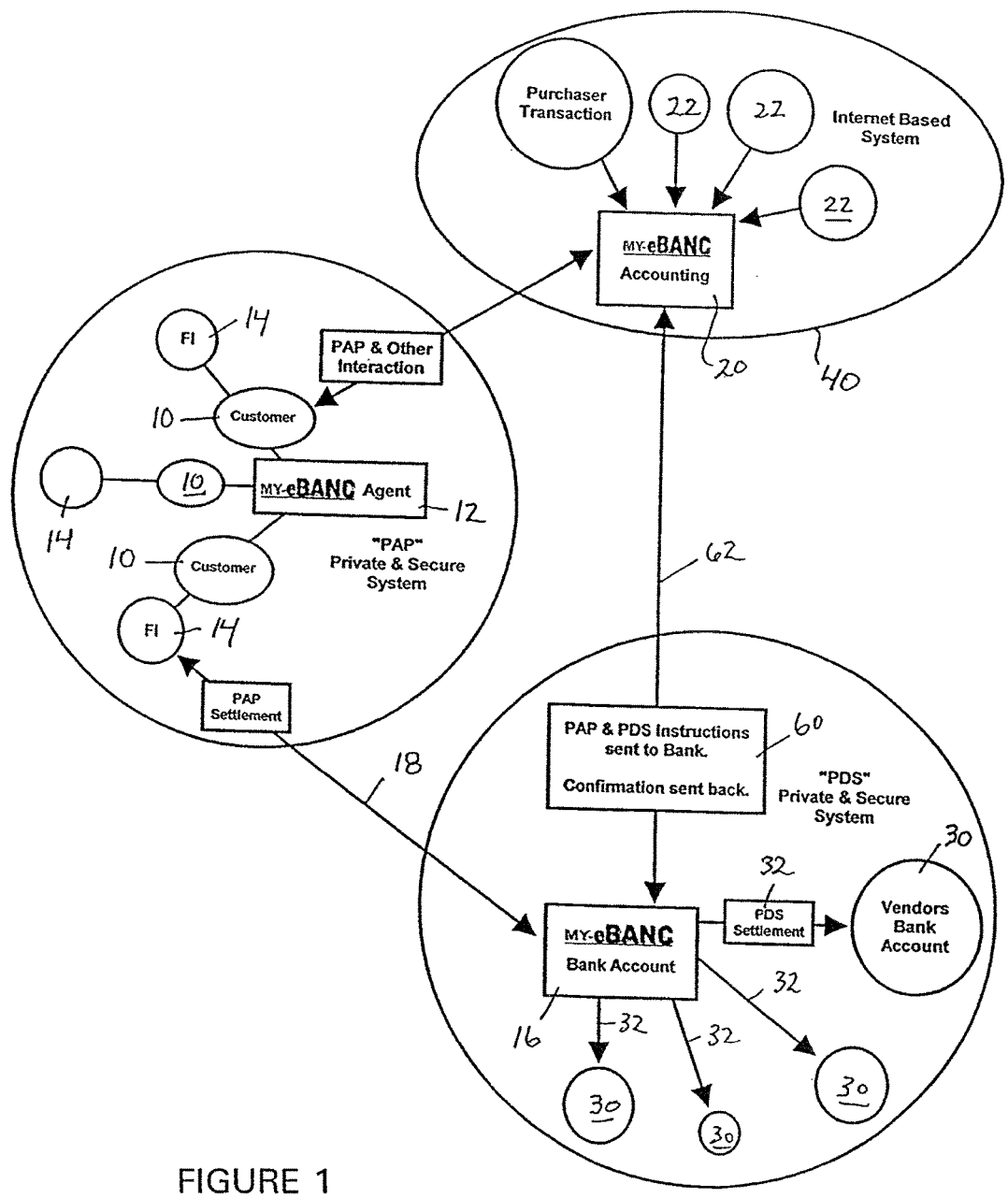
FIG. 1 is a schematic diagram illustrating the method of the invention.

With reference to FIG. 1, a customer 10 registers to use the system with an agent 12 for the electronic funds transfer system manager (referred to herein as "my-eBanc") by agreeing to an "Authorization for Pre-Authorized Debits", whether for personal and/or business purposes, as standardized, for example, by the Canadian Payments Association, whether by signing a standard form or clicking on an electronic button. Such form authorizes my-eBanc to issue Pre-Authorized Debits ("PAD") to be drawn on an account. It specifies the customer's financial institution 14 ("the Processing Institution"), such as a bank, provides a bank account number, and authorizes the issuance of a PAD by my-eBanc up to a given maximum. Such form provides that the Processing Institution is not required to verify that the terms of the Authorization have been complied with before honouring a PAD issued by my-eBanc on the designated account. The customer 10 also provides an e-mail address and selects a username and confidential password. My-eBanc then issues a unique, confidential identification number which it associates with the customer username and password, and which can be stored as an encrypted "cookie" on the customer's computer so that the customer need not always enter the password when communicating with the my-eBanc server.

While preferably this customer registration is done through a personal agent 12, it can also be done through the my-eBanc web site 20 or via a 1-800 telephone number, for example. If done through a personal or vendor agent 12, the system can be promoted by providing the agent with a commission or royalty based on the volume of sales by the customer.

In order to ensure that the account number (the RTN or Routing Transit account Number) in fact corresponds to a bank account owned by the individual purporting to own the account before the customer is given access to the my-eBanc system, the following method can be used. Upon registration the customer submits the RTN, the accuracy of which can be confirmed by requiring the customer to re-enter or confirm it. The electronic funds transfer system manager (my-eBanc) then generates a random confirmation code (RCC) consisting of a string of alpha-numeric characters, part of which identifies the source of the string and part of which is randomly generated, for example MEB145jpu840vbi, where MEB indicates my-eBanc as the source, and the balance of the string is random. The RCC is stored in database 28 along with the other customer-related information. My-eBanc then makes a nominal deposit, say $0.15, to the customer's account corresponding to the RTN using the Payment Distribution System of the ACH, and using the RCC as the reference number. Therefore on the customer's account statement the RCC will appear in the Transaction description column next to the credit column showing the $0.15 deposit. The customer is then sent an e-mail instructing the customer to obtain the RCC from his or her bank statement (which is frequently accessible on-line to the customer) and enter it in the my e-Banc web site. For example the customer is instructed as follows:

——1. Get the 15-character alphanumeric code starting with MEB from your bank account statement that corresponds to a $0.15 deposit.
2. Go to the following web link www.my-eBanc.com.
3. Enter your user name.
4. Enter your password.
5. Enter the 15-character code.——

The code entered by the customer is then compared to the code stored in database 28 for the customer and, if identical, the customer is given access to the my-eBanc system. If the codes are different, the customer is asked to re-enter it and the codes are compared again. This process is repeated a limited number of times. If the customer does not achieve a match, then the session is terminated and the customer is instructed to commence the process again by re-submitting an RTN number, and the foregoing process is repeated.

To commence using the system, the customer 10 authorizes a PAD in a specific amount, e.g. $1,000 to be issued to my-eBanc and my-eBanc causes the Processing Institution 14 to transfer such funds from the designated account to my-eBanc's bank account 16 utilizing the ACH system, as indicated by transfer line 18. The customer is then credited the amount of the transfer, by reference to its customer identification number, in the customer credit database 28 (see FIG. 2). Subsequently, the customer can instruct my-eBanc to transfer funds from the customer's account to my-eBanc's bank account 16 utilizing the ACH system, either through the agent 12 or through the my-eBanc web site. The customer will do this whenever additional funds are required to cover its on-line transactions. The customer can also request my-eBanc to return funds at any time to the customer bank account which my-eBanc will do through the Payment Distribution System of the ACH.

Similarly, participating vendors are required to register for the system as follows. Again, the vendor registration is preferably done through a personal agent 12, but it can also be done through the my-eBanc web site 20 or via a 1-800 telephone number, for example. The vendor provides the vendor's bank account information for the purpose of receiving deposits through the ACH into the vendor's bank account 30, as well as an e-mail address. The vendor also provides an Internet web site 22 at which the customer 12 can view and select for purchase digital or physical goods or services. However the invention can also be utilized to pay for goods or services delivered at a physical location, or over the telephone or other communication system. Where a vendor web site is the location for purchase of goods or services, the vendor is provided with software which will interface with the my-eBanc web site.

To carry out a purchase of goods or services over the Internet or other global computer network 40 using the system of the present invention, the customer accesses the Internet web site 22 of the my-eBanc registered vendor and orders the desired goods or services. Upon selecting "my-eBanc" as the method of payment, the my-eBanc software calls up a my-eBanc web page to the customer and invites the customer to enter its username and password, or just its username where the customer identification has been stored in a cookie, and clicks on a button to authorize the transaction. Using the software provided by my-eBanc, the vendor's site then communicates with the my-eBanc web site server 46 and provides the amount of the purchase and the vendor identification number. The my-eBanc server 48 then checks the identity of the customer, the value of the transaction, and confirms in database 28 that adequate funds are available to the customer's credit in the my-eBanc account 16. The my-eBanc server 46 then sends electronic instructions to the vendor either confirming that the transaction can proceed or advising that the transaction cannot proceed. If the funds are available, my-eBanc issues a Payment Distribution System instruction to transfer the amount of the transaction from the my-eBanc account to the vendor's bank account 30, and the vendor downloads the electronic goods to the customer, or ships the physical goods. The Payment Distribution System instructions are issued over secure communication lines, whether telephone or web-based, to the ACH, and the financial institution processes the transaction overnight, causing the settlement of funds 32 to be made. My-eBanc then sends a confirming e-mail to the vendor and customer confirming the transfer of funds and records a debit in that amount against the customer's credit in database 28 (see FIG. 2).

Cross-border transactions where the currency of the vendor differs from the currency of the customer's account can also be conducted. The my-eBanc web site 46 checks the currency of the vendor's destination for payment, checks the current conversion rate from the customer's currency to the vendor's currency, and determines the equivalent amount to be charged to the customer account for the transaction. If sufficient funds are in the my-eBanc account to the customer's credit, my-eBanc instructs the ACH to withdraw the funds in the calculated amount from the my-eBanc account and to transfer the appropriate amount of foreign currency to the vendor account.

Figure 2:
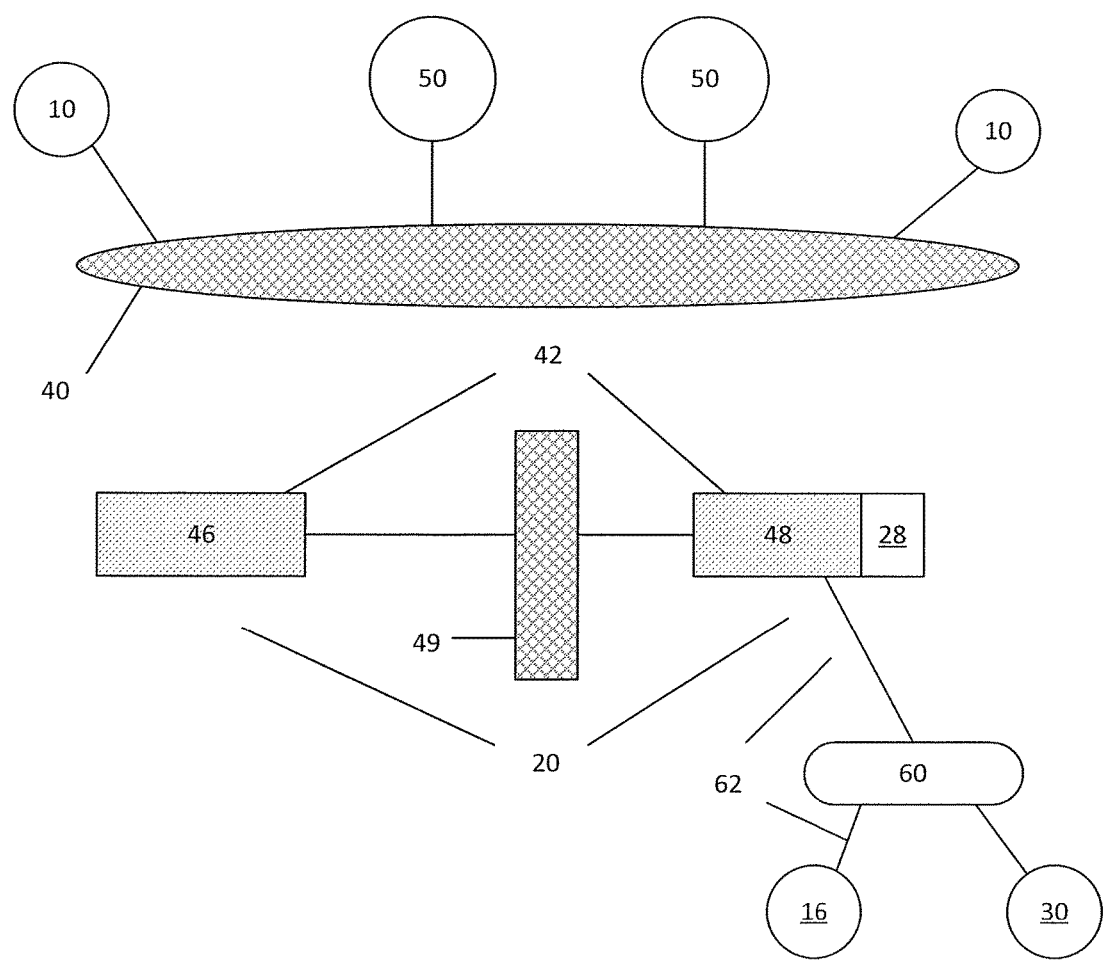
FIG. 2 is a schematic illustration of a computer network for carrying out the invention.
Figure 3:
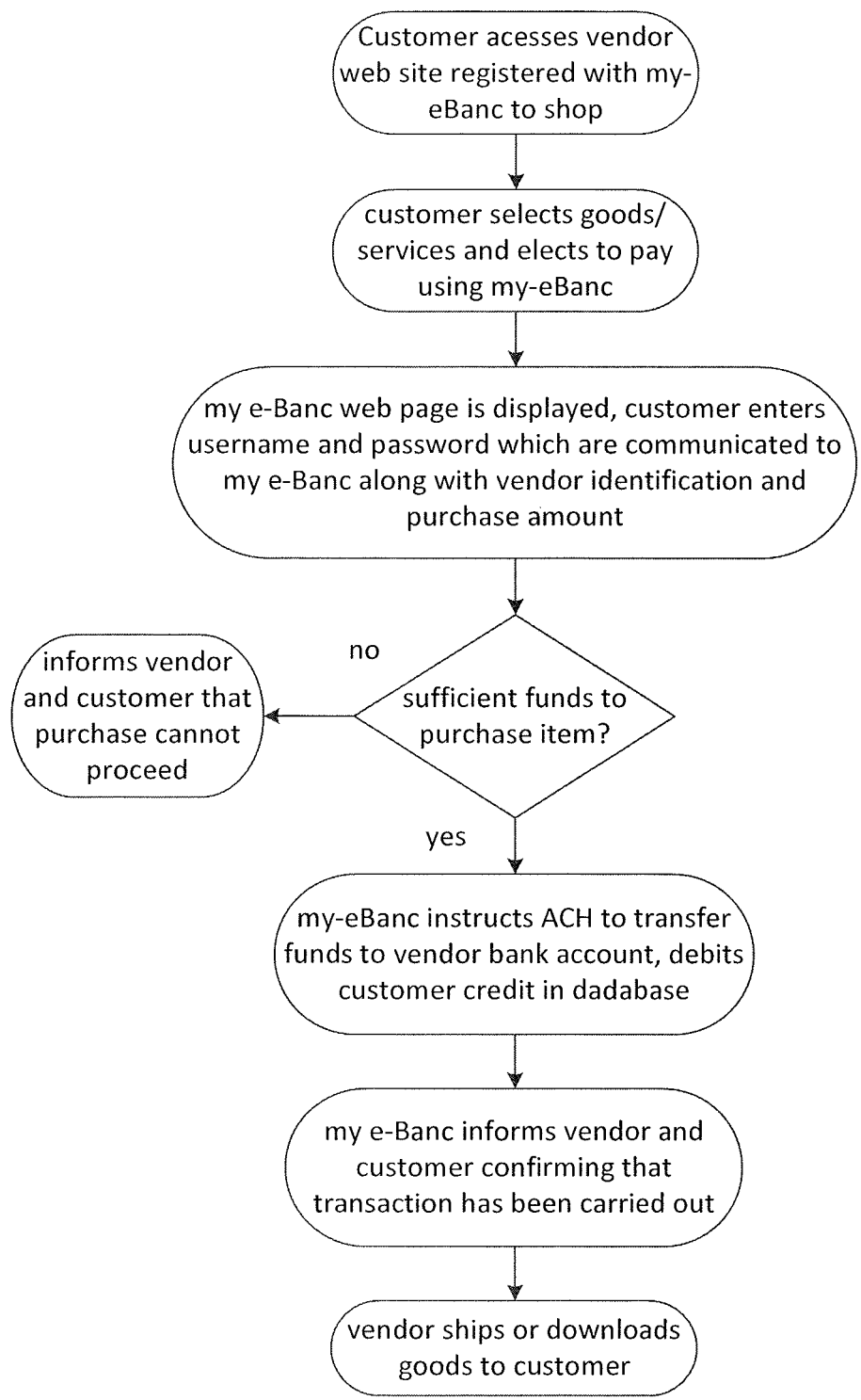
FIG. 3 is a flowchart illustrating the method of the invention.

With reference to FIG. 2, the my-eBanc web site 20, for example at the URL www.my-ebanc.com, consists of a web server 42, comprising web server 46 accessible to the Internet 40. Customers 10 and vendors 50 have access to the Internet network 40 via remote client terminals using available Internet browser software. Web server 42 also includes a secure server 48 including account information databases such as customer credit database 28, and which is protected from the Internet access by firewall 49 but can communicate with server as well as Automated Clearing House 60, which in turn communicates with financial institutions 16, 30 by secure communication lines 62. Firewall 49 reduces the possibility that hackers can access or alter account information.

Physical Purchases

According to a second variant of the invention, a customer can use the system of the invention to pay for goods or services at a physical location through a web-accessible terminal 50 having access to the Internet, either a vendor's terminal or a customer's wireless device. The customer enters its username and password confidentially onto the my-eBanc web site and the vendor transmits the transaction through the my-eBanc web site as noted above. The vendor provides the amount of the transaction. The vendor identification can be entered manually or automatically from a "cookie" on a vendor's terminal 50.

The method of ensuring that an account number in fact corresponds to the account owned by the individual purporting to own the account, as described above, also has application to other systems such as credit card charge systems where it is desirable to pre-confirm the validity of the account number. In many situations, both online and offline, a customer will authorize a regular payment to be billed to a credit card. The validity of the credit card account can be verified in a one-time method as was described above. When the customer submits the card number, the customer can first be requested to re-enter or confirm it. The credit card system manager then generates the random confirmation code (RCC) consisting of a string of alphanumeric characters, part of which identifies the source of the string and part of which is randomly generated. The RCC is stored in a database along with the other customer-related information. The credit card manager then makes a nominal credit, say $0.15, to the customer's account corresponding to the account number, using the RCC as the transaction description or reference. Therefore on the customer's account statement the RCC will appear in the Transaction Description column next to the Amount (CR=credit) column showing the $0.15 credit. The customer is then sent an e-mail instructing the customer to view its account statement, which is frequently accessible on-line to the customer, to obtain the RCC corresponding to the $0.15 credit and enter it in the credit manager's web site. For example the customer is instructed as follows:

——1. Get the 15-character alphanumeric code starting with XXX from your account statement that corresponds to a $0.15 credit
    2. Go to the following web link www.visa.com.
    3. Enter your user name.
    4. Enter your password.
    5. Enter the 15-character code.——

The code entered by the customer is then compared to the code stored in database 28 for the customer and, if identical, the customer's transaction is approved. If the codes are different, the customer is asked to re-enter it and the codes are compared again. This process is repeated a limited number of times. If the customer does not achieve a match, then the session is terminated and the customer is instructed to commence the process again by re-submitting another card number, and the foregoing process is repeated. This method will be less useful for single merchant transactions, but is particularly useful where a regular charge is desired to be made to a credit card.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of securely transmitting sensitive financial transaction information over telephone lines or the Internet by utilizing the security of the Automated Clearing House Network when conducting online purchases of goods or services by a customer from one or more participating vendors over a computer network using a system manager, said customer having a customer bank account at a financial institution and said one or more participating vendors each having a vendor bank account at a financial institution, said customer and vendor bank accounts being accessible through the Automated Clearing House Network, said computer network having a web server, and a secure system manager server coupled to a telecommunication device which is either telephone or Internet-based for communicating over a secure communication channel, said secure system manager server being programmed for maintaining an originator account to receive electronic transfer of funds and generating Automated Clearing House Network data files for transmission to the Automated Clearing House to transfer funds electronically; said secure system manager server having a central processing unit, a memory, and a non-transitory computer-readable medium with programmed instructions stored thereon, that when executed by a processor, performs the steps comprising:

i) receiving customer identification and payment instructions in respect of goods or services for purchase by a customer along with vendor identifications from a participating vendor via the web server;
  ii) storing the vendor identification instructions in a first memory location;
  iii) storing the payment instructions in a second memory location;
  iv) generating an electronic file from said stored data to form an Automated Clearing House data file having the Automated Clearing House file format specifications for communicating Payment Distribution System instructions;
  v) instructions are issued, activating an application, activating the telecommunications device which is either telephone or internet-based by receiving instructions from the processor which executes programmed instructions stored on the non-transitory computer-readable medium to instruct the telecommunications device, when telephone based, to open said secure communication channel and dial a receiving telephone party address or when the device is internet-based by issuing instructions to open an online session to generate a Payment Distribution System instruction for communicating over said secure communication channel with a receiving internet party address;
  vi) transmitting said Payment Distribution System instruction to the Automated Clearing House Network via said telecommunication device which is either telephone or internet-based over said secure communication channel;
  vii) receiving via said telecommunication device which is either telephone or internet-based over said secure communication channel from the Automated Clearing House Network an indication that the Automated Clearing House data file was transmitted and received successfully;

said method comprising:
  a) said system manager maintaining said originator account for said system manager to receive electronic transfer of funds, said originator account being accessible for transfer of funds electronically over said secure communication channel, by said telecommunication device which is either telephone or Internet-based over the Automated Clearing House Network;
  b) said system manager maintaining an account representing the balance of funds held to said customer's credit in said originator account;

c) said system manager receiving from said customer an authorization to draw funds from said customer bank account;
d) said system manager receiving bank account information identifying said participating vendors' bank accounts;
e) said system manager receiving via the Internet a charge amount for a proposed purchase by said customer from a first participating vendor and identification of said customer and said first vendor;
f) said system manager, either before or after step e) generating an electronic file to form an Automated Clearing House data file and communicating said Automated Clearing House data file thereby electronically transferring sufficient funds over said secure communication channel, by said telecommunication device to the Automated Clearing House Network for said purchase into said originator account to said customer's credit;
g) said system manager confirming the availability of sufficient funds to said customer's credit in said originator account for said charge amount and communicating via the Internet the results of said confirmation to said first vendor to indicate whether to proceed with said purchase;
h) if sufficient funds to said customer's credit are available in said originator account for said charge amount, electronically transferring the amount of said charge amount to said first vendor; and
i) said system manager confirming via the Internet to the customer and to said first vendor the transfer of said charge amount to said first vendor.

2. The method of claim 1 wherein said charge amount is transferred to said first vendor's bank account through the Automated Clearing House Network.

3. The method of claim 1 wherein said originator account is a bank account at a financial institution.

4. The method of claim 1 wherein said funds are transferred to said customer's credit into said system manager originator account by obtaining a customer pre-authorized debit authorization in favour of said system manager.

5. The method of claim 1 further comprising providing a system manager web site accessible to customers on the Internet via a plurality of client terminals, said Internet accessible web site receiving said communication of said proposed charge amount, vendor identification and said customer identification.

6. The method of claim 5 further comprising a secure server communicating with said Internet accessible server for maintaining said account representing the balance of funds held to said customer's credit in said originator account.

7. The method of claim 1 comprising the further step of confirming a customer bank account number by said system manager making a deposit to said customer bank account corresponding to said customer and having said customer communicate information concerning said deposit to said system manager.

8. The method of claim 7 wherein the system manager assigns a reference code to the customer, stores said reference code, makes a deposit to the customer bank account corresponding to said customer along with said reference code and instructs said customer to obtain said reference code from said customer's bank statement relating to said customer bank account for comparison to said stored reference code.

9. The method of claim 1 wherein said customer identification
is stored by said system manager in association with a unique identifier provided by said customer upon registration of said customer with said system manager.

10. The method of claim 9 wherein said unique identifier is provided by said customer for each said purchase.

11. The method of claim 10 wherein said customer communicates said purchase to said system manager through a communication device and said unique identifier is provided by said customer for each said purchase either manually or automatically by said customer's communication device.

12. The method of claim 1 wherein said system manger is provided vendor bank account information for each said participating vendor's bank account at the time of registration of each said participating vendor with said system manager.

13. The method of claim 5 wherein said customer accesses said system manager website through a participating vendor's website.

14. The method of claim 5 wherein said customer accesses said system manager website from a wireless device or a vendor's terminal.

15. A computer implemented system for securely transmitting sensitive financial transaction information over the Internet by utilizing the security of the Automated Clearing House Network when conducting online purchases of goods or services by a customer from one or more participating vendors over the Internet using a system manager, said customer having a customer bank account at a financial institution and said participating vendors each having a vendor bank account at a financial institution, said system manger having an originator bank account for said system manager to receive electronic transfer of funds, said originator account being accessible on a computer programmed to transfer funds electronically over a secure communication channel, by a telecommunication device which is either telephone or Internet-based to the Automated Clearing House Network, said system manager, customer and vendor bank accounts being accessible through the Automated Clearing House Network, said system comprising:
a) a system web server accessible to customer and vendor terminals over the Internet via a plurality of said client terminals, said web server comprising computer software which when executed maintains an interactive system manager web site to receive communications of proposed charge amounts in association with a customer identification from said customer and vendor identification from said vendor;
b) a secure system server communicating with said system web server, said secure system server comprising a central processing unit, a memory, and a non-transitory computer-readable medium with programmed instructions stored thereon, that when executed by a processor:
i) communicates over the Internet with a plurality of bank servers accessible to the Internet;
ii) maintains customer accounts representing a balance of funds held to said customers' credit in a said originator account;
iii) receives customer identification and payment instructions in respect of goods or services for purchase by a customer along with vendor identifications from a participating vendor via the web server;
iv) stores the vendor identification instructions in a first memory location;

v) stores the payment instructions in a second memory location;

vi) generates an electronic file from said stored data to form an Automated Clearing House data file having the Automated Clearing House file format specifications for communicating Payment Distribution System instructions;

vii) activates an application, activating the telecommunications device which is either telephone or internet-based by receiving instructions from the processor which executes programmed instructions stored on the non-transitory computer-readable medium to instruct the telecommunications device, when telephone based, to open said secure communication channel and dial a receiving telephone party address or when the device is internet-based by issuing instructions to open an online session to generate a Payment Distribution System instruction for communicating over said secure communication channel with a receiving internet party address;

viii) transmits the said Payment Distribution System instruction to the Automated Clearing House Network via said telecommunication device which is either telephone or internet-based over said secure communication channel;

ix) receives via said telecommunication device which is either telephone or internet-based over said secure communication channel from the Automated Clearing House Network an indication that the Automated Clearing House data file was transmitted and received successfully;

x) draws funds through the Automated Clearing House Network over said secure communication channel, by said telecommunication device which is either telephone or Internet-based to the Automated Clearing House system from said customer bank account when said system manager has been provided by said customer an authorization to draw said funds from said customer bank account;

xi) receives via the Internet a charge amount for a proposed purchase by said customer from a first participating vendor and identification of said customer and said first vendor;

xii) either before or after receiving a charge amount for a proposed purchase, transfers sufficient funds through the Automated Clearing House Network over said secure communication channel, by said telecommunication device to the Automated Clearing House Network for said purchase into said originator account to said customer's credit;

xiii) confirms the availability of funds in association with said customer identification for said charge amount and communicates via the Internet the results of said confirmation to said first vendor to proceed with said purchase;

xiv) electronically transfers the amount of said charge amount to said first vendor's bank account through the Automated Clearing House Network over said secure communication channel, by said telecommunication device to the Automated Clearing House Network;

xv) confirms via the Internet to the customer and to said first vendor the transfer of said charge amount to said vendor.

16. The system of claim 15 wherein said originator account is a bank account at a financial institution.

17. The system of claim 15 wherein said programmed instructions when executed confirm a customer bank account number by making a deposit to the bank account corresponding to said customer and receive a customer communication confirming said deposit.

18. The system of claim 17 wherein the programmed instructions assign a reference code to the customer, store said reference code, make a deposit to the account corresponding to said customer account number along with said reference code, receive from said customer a reference code from said customer's bank statement and compare said received reference code to said stored reference code.

19. The system of claim 15 wherein said customer identification
is stored by said system manager in association with a unique identifier provided by said customer upon registration of said customer with said system manager.

20. The system of claim 15 wherein said programmed instructions store vendor bank account information for said participating vendors bank accounts at the time of registration of said participating vendors with said system manager.

* * * * *